C. PRACHE.
ELECTRICAL CONTROL MECHANISM.
APPLICATION FILED AUG. 19, 1913.
1,212,554.
Patented Jan. 16, 1917.
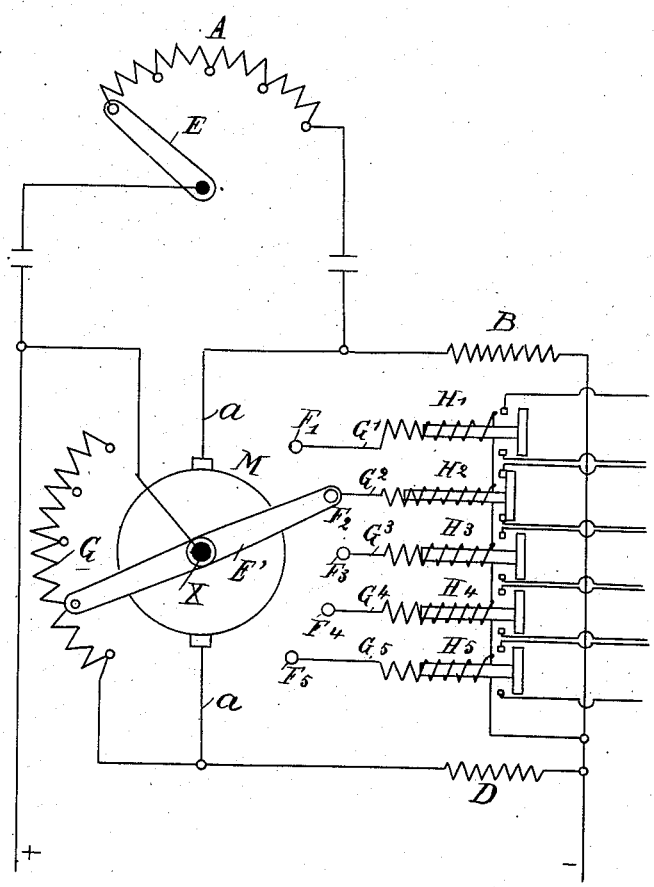

UNITED STATES PATENT OFFICE.

CHARLES PRACHE, OF PARIS, FRANCE.

ELECTRICAL CONTROL MECHANISM.

1,212,554.   Specification of Letters Patent.   Patented Jan. 16, 1917.

Application filed August 19, 1913. Serial No. 785,512.

*To all whom it may concern:*

Be it known that I, CHARLES PRACHE, residing at Paris, France, have invented a new and useful Improvement in Electrical Control Mechanism, which improvement is fully set forth in the following specification.

This invention relates to remote control mechanism and has for its object an electric control system which allows the movement of one or more parts, for example a search light, to be controlled from a distance.

Each part or group of parts controlled is actuated by means of a suitable motor and according to this invention the movements of the parts or groups of parts are caused by the different positions of equilibrium assumed by a suitable electric motor arrangement placed in the neutral wire of an arrangement identical with or similar in principle to a Wheatstone bridge whose balance is disturbed by varying one of the resistances of the bridge located at the control station. The current due to such disturbance actuates the motor arrangement which through the intermediary of suitable controlling devices acts upon one or more of the other resistances in such a manner as to restore the balance of the bridge. In its movement the motor makes successively several contacts which each close for example the control circuit for the movement of some part or other. Each position of the resistance switch at the control station corresponds to a given position of the motor arrangement and therefore to a displacement of some or other of the parts controlled. One advantage of the arrangement is that it is absolutely independent of the variations in voltage of the line. In place of directly closing the contacts of the motors which move the parts to be actuated relays are preferably set in action which in their turn close the contacts for such motors. When at the control post the balance of the bridge is disturbed, the motor arrangement will move and again assume a position of equilibrium but before making the contact appertaining to such position it may make and break a number of contacts which precede such contact and thus cause a momentary making and breaking of circuits corresponding for example to the movement of other parts. In order to prevent any undesired movements the motor parts or the relays may be sluggish in their operation and made to possess an inertia sufficient to prevent a momentary closing of the circuit from operating a motor.

The accompanying drawing illustrates diagrammatically one arrangement for carrying out this invention.

In this drawing the Wheatstone bridge is composed of four resistances A B G D and a neutral wire $a$ upon which is branched the motor arrangement M (a galvanometer, electric motor, etc.) capable of turning about its axis X in either direction according to the direction of the current passing in the wire $a$.

E is an arm (or a series of press buttons, or any other suitable arrangement,) in series with the resistance A whose movement varies the resistance and therefore disturbs the balance of the bridge. The source of electric current is only indicated in the drawings by the $+$ and $-$ signs.

The motor M in turning moves the arm $E^1$ which both varies the resistance G and makes one or more of the contacts $F_1$ to $F_5$ corresponding to circuits $G^1$ to $G^5$ controlling the different motor arrangements of the parts to be actuated. The resistance A is at the controlling station while the resistance G is arranged at the controlled station.

In place of directly controlling the motor arrangements properly so called, the circuits $G^1$, $G^2$, etc., might equally well control auxiliary arrangements such as relays $H^1$ to $H^5$ for example.

The movement of the arm E for a given distance varies the resistance A which will disturb the balance of the bridge, a current will pass in the wire $a$ and persist until the motor M restores the balance of the bridge thus bringing the arm $E^1$ into the position corresponding to that of the arm E, when the arm $E^1$ will be arrested upon one of the contacts $F_1$—$F_5$ which determine the movement of one of the parts controlled.

Claims:—

1. In remote control mechanism, the combination of a Wheatstone bridge having two variable resistances, one of said variable resistances being located at the control station, the other variable resistance being located at the controlled station, a sluggish relay, and an electric device connected in circuit with the bridge, the device operating in response to variations in the resistance at the control station and having a part coöperating with the variable resistance at the controlled station to restore the electrical balance of the bridge and to bring the electric device to rest for a sufficient time to operate the relay.

2. In a remote control mechanism, the combination of a sluggish relay, a device comprising two variable resistances, and an electric device controlling said relay and connected in circuit with said resistances and responsive to variations of one of said resistances and having a part coöperating with the other resistance to bring the electric device to rest for a sufficient period to cause the operation of the relay.

3. In a remote control mechanism the combination of a plurality of sluggish relays controlling separate circuits, two circuits in parallel, each circuit comprising a variable resistance, and an electric device capable of causing the operation of any one of said relays, said electric device being connected with said variable resistances and operating in response to variations of one of said resistances, said device having a part coöperating with the other resistance to bring said device to rest at a predetermined point and for a sufficient period to cause a selected relay to operate.

4. In a remote control mechanism, the combination of two circuits in parallel, each circuit including a variable resistance, a plurality of devices to be controlled, and means in circuit with said resistances and operating in response to the variation of one of said resistances to cause the operation of a selected one of said devices.

5. In a remote control mechanism the combination of a Wheatstone bridge having variable resistance in two of the limbs thereof, an electric motor connected in circuit with the neutral conductor of the bridge, and a plurality of relays controlling separate circuits said motor being capable of causing the energization of any selected relay and operating in response to variations of one of said resistances, said motor carrying a part coöperating with the other variable resistance to bring said motor to rest at a predetermined point to cause the operation of a selected relay.

6. In an electric control mechanism the combination of a Wheatstone bridge having variable resistances in circuit with two limbs thereof, an electrical device in circuit with said bridge and operative in response to variations of one of said resistances, means whereby the other variable resistance is controlled by said electric device, a plurality of relays controlling separate circuits, said electric device being capable of energizing any selected relay.

7. In an electric control mechanism, the combination of a Wheatstone bridge having variable resistances in two limbs thereof, an electric circuit to be controlled, an electrical device in circuit with said bridge, means whereby said device operates in response to variations in one of said resistances to control said electric circuit and to adjust the other resistance to balance the bridge and bring said device to rest at a predetermined point, a plurality of relays controlling separate circuits, said electric device being capable of energizing any selected relay.

8. In a remote control mechanism, the combination of a source of current supply, a Wheatstone bridge connected to said current supply, said bridge comprising variable resistances in two limbs thereof, an electric motor connected across the neutral points of said bridge, said motor operating in response to variations of one of said resistances, a series of separate circuits, a separate relay for controlling each of said circuits, each relay having a coil connected with one branch of said source of supply, means movable by said motor for completing the connection of any coil to the other branch of the supply, and means coöperating with the other variable resistance for bringing said motor to rest at a predetermined point corresponding to a selected relay.

In testimony whereof I have signed this specification in the presence of two subscribing witnesses.

CHARLES PRACHE.

Witnesses:
 HANSON C. COXE,
 GASTON BRUNDARY.